United States Patent [19]

Megeid

[11] Patent Number: 4,523,158
[45] Date of Patent: Jun. 11, 1985

[54] CLOCK REGENERATOR USING TWO ON-OFF OSCILLATORS

[75] Inventor: Mohamed M. A. Megeid, Zurich, Switzerland

[73] Assignee: RCA Corporation, Princeton, N.J.

[21] Appl. No.: 463,165

[22] Filed: Feb. 2, 1983

[51] Int. Cl.³ .................. H03L 7/24; H04L 27/12
[52] U.S. Cl. .................................. 331/55; 331/56; 331/173; 331/179; 331/DIG. 3; 332/14; 332/23 R; 375/45; 375/62
[58] Field of Search ............... 331/49, 55, 56, 172, 331/173, DIG. 3, 179; 332/9 R, 14, 23 R; 375/45, 47, 62, 64, 66, 110; 329/122, 123

[56] References Cited
U.S. PATENT DOCUMENTS

| | | | |
|---|---|---|---|
| 2,728,856 | 12/1955 | Hannum et al. | 331/49 |
| 3,525,054 | 8/1970 | Denney | 331/49 |
| 4,413,236 | 11/1983 | Sochor | 331/173 X |

FOREIGN PATENT DOCUMENTS 1570207  6/1980  United Kingdom ......... 331/DIG. 3

OTHER PUBLICATIONS

PMI Data Book pp. 2-64 and 3-57 from 1982 PMI Data Book, published 1981 by Precision Monolithic, Inc., Santa Clara, CA 94086.

*Primary Examiner*—Siegfried H. Grimm
*Attorney, Agent, or Firm*—Eugene M. Whitacre; William H. Meise; Henry I. Steckler

[57] ABSTRACT

A clock pulse regenerator uses a pair of oscillators each comprising a NOR gate and a transmission line feedback element. The oscillators are provided with complementary data pulses and provide an output signal only when the data signal is of a selected logic level. The output signals are combined to form a continuous regenerated clock signal. An FSK encoder using similar oscillators is also disclosed.

1 Claim, 5 Drawing Figures

CLOCK REGENERATOR USING TWO ON-OFF OSCILLATORS

BACKGROUND OF THE INVENTION

The present invention relates to clock signal regenerators, and more particularly, to ones that work at extremely high speeds.

Recently interest has grown in digital video signal transmission wherein the luminance signal (Y) is 8-bit sampled at 13.5 MHz and the R-Y and B-Y color difference signals are each 8-bit sampled at 6.75 MHz. Serial transmission requires a data rate of 8(13.5+6.75+6.75)=216 Mbits/s. Since the data signal is transmitted asynchronously (without a separate sync or clock signal), the clock signal must be recovered from the data signal itself.

A typical prior art clock regenerator uses a PLL (phase-locked-loop) oscillator which is controlled by the received signal. The oscillator output signal is applied to a variable phase shifter and then to a clock driver, which shifter is adjusted so that the positive going transitions of the phase shifted signal occur in the middle of the received data pulses. A data regenerator receives both the phase-shifted signal from the driver and the data signal and supplies a regenerated data signal. However, at a 216 Mbits/s data rate, the positive going transitions of the clock signal must occur within about ±2 ns of the center of the received data bits. With the prior art this accuracy is not achieved due to propagation delays in the PLL and clock driver.

It is therefore desirable to provide a clock regenerator that can be used at high frequencies.

SUMMARY OF THE INVENTION

Method and apparatus comprising providing opposite logic level data pulses to a pair of oscillators respectively, each of said oscillators oscillating only when the data pulses applied thereto are of a selected logic level, and combining the output signals of said oscillators.

DETAILED DESCRIPTION

Figure 1:
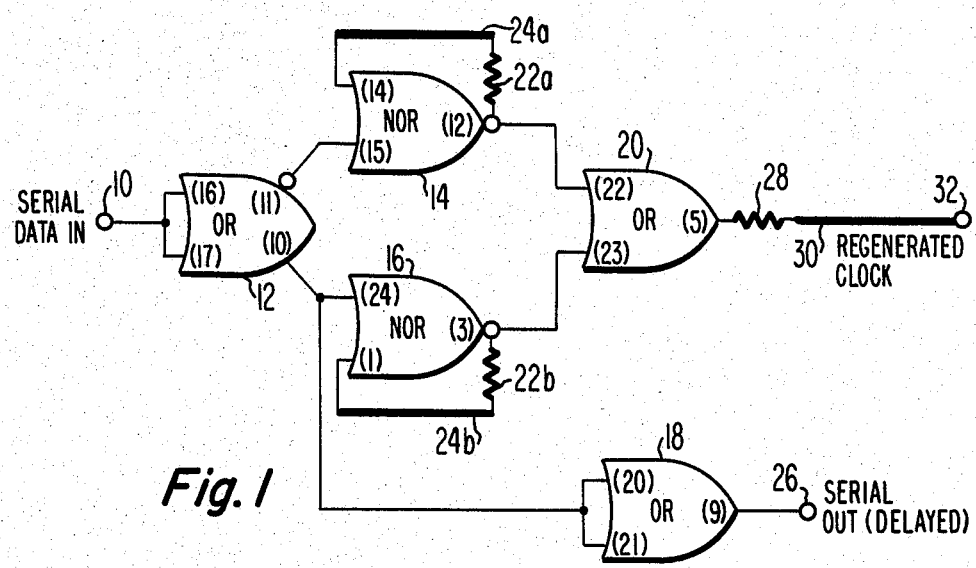
FIG. 1 shows a first embodiment of the invention for regenerating clock signals.

In FIG. 1 input terminal 10 receives serial digital data, e.g., an 8-bit digital video signal, from a transmission path such as a signal broadcast from a satellite or a video tape recorder. The input signal is applied to OR/-NOR gate 12, which is of the ECL (emitter coupled logic) family. Gate 12, as well as all gates described below can be on a single chip such as Fairchild type F 100 102. Pin numbers are indicated in parenthesis. The data signals at the inverting and non-inverting outputs of gate 12, which have no propagation delays with respect to each other, are respectively applied to inputs of NOR gates 14 and 16, which gates have a propagation delay of $T_1$. Delay $T_1$ is nearly constant if fully temperature compensated gates such as present in the above chip are used. In addition, the signal at the non-inverting output of gate 12 is applied to both inputs of OR gate 18. Input pins (15) and (24) are normally biased to a ZERO logic level by a biasing means (not shown).

The outputs of gates 14 and 16 are respectively coupled to the inputs of OR gate 20 and in addition are coupled to resistors 22a and 22b respectively and then to transmission lines 24a and 24b respectively. Transmission lines 24 can comprise coaxial cable or strip line on a printed circuit board and have a delay time $T_2$, while resistors 22 have a resistance matching the characteristic impedance of lines 24. The outputs of transmission lines 24a and 24b are coupled to inputs of gates 14 and 16, respectively, thereby forming STOP-START oscillators, which are oscillators that always start with a selected phase transition as explained below.

When the data signal at the respective output of gate 12 is ONE, then the output signal from the respective gate 14 or 16 is ZERO and no oscillation takes place. When the output signal from one of the outputs of gate 12 is ZERO, and since initially the output of the particular line 24 is ZERO, the output of gate 14 or 16 becomes ONE. This output ONE is propagated to the input of the particular gate 14 or 16, which now makes the output of said gate ZERO. This ZERO is in turn propagated through one of lines 24 and applied to the input of said gate, thereby making its output ONE, etc. Thus oscillation takes place and starts with a delayed ZERO to ONE transition at the output of NOR 14 or 16, said delay being $T_1$. The oscillation frequency $f_0$ is $$f_0 = \frac{1}{2(T_1 + T_2)}. \tag{1}$$

By adjusting the length of lines 24, $f_0$ can be set as desired, e.g., 216 MHz.

Since due to the complementary outputs of gate 12, one of gates 14 or 16 always receives a ONE, while the other gate always receives a ZERO, one of gates 14 or 16 is always oscillating, while the other gate is not oscillating. Thus the output signal from gate 20 is a continuous pulse train and comprises the regenerated clock signal. Gate 18 is used to delay the serial data from the non-inverting output of gate 12 by an amount equal to that of the delay of gate 20, which is possible since gates 18 and 20 are on the same chip and therefore have the same delay.

It is still necessary to delay the clock signal from gate 20 so that its positive going transition is centered relative to the data from gate 18, which data is available at output terminal 26. This is achieved by applying the output signal from gate 20 to resistor 28 and then to transmission line 30 having a delay of $T_4$. The resistance of resistor 28 matches the characteristic impedance of transmission line 30. Assuming that the delays of gates 18 and 20 are equal, and remembering from above that oscillation starts with a delay $T_1$, then equation for centering is:

$$T_1 + T_4 = \frac{T_0}{2} \tag{2}$$

or $$T_4 = \frac{T_0}{2} - T_1, \tag{3}$$

wherein

-continued $$T_0 = 1/f_0.$$

For $f_0 = 216$ MHz, $T_0 = 4.63$ ns, and for the F 100 102 chip $T_1 = 0.75$ ns.

$T_4$ can be calculated to be 1.565 ns. It can be shown by algebraic manipulation of equation (1) that the equation for $T_2$ is exactly the same as that for $T_4$, and thus $T_2 = 1.565$ ns. In particular $$f_o = \frac{1}{T} = \frac{1}{2(T_1 + T_2)}$$

$$T_0 = 2T_1 + 2T_2$$
$$T_0 - 2T_1 = 2T_2$$
or
$$T_2 = \frac{T_o}{2} - T_1.$$

The centered regenerated clock signal is available at output terminal 32, and typically would be applied to the SHIFT input of an ECL shift register (not shown). The data at output 26 would be applied to the data input of said register. The register performs data regeneration and provides parallel data output signals.

Errors caused by tolerances of $T_2$ and $T_4$ are now considered. The error caused by $T_4$ can be precisely adjusted by adjusting the length of the coaxial cable, and therefore this error can be neglected. However, errors in $T_2$ will cause an error in the oscillation frequency, e.g., a deviation from 216 MHz. The actual oscillation frequency is designated $f'_o$ and its period $T'_o$. This frequency error causes a deviation of the positive going edge of the regenerated clock signal from the center of the data signal, which deviation is called $\Delta T_{ph}$. Since the oscillators are synchronized to the incoming data when the data changes logic levels, $\Delta T_{ph} = 0$ at this time. However if the data stays at the same level, $\Delta T_{ph}$ progressively increases; in particular it is proportional to K, where K is the number of free running oscillator cycles before resynchronization by a change in data level.

The deviation after K cycles is:

$$\Delta T_{ph} = (K-1)|T_0 - T_0| \quad (4)$$

Since the maximum value for the deviation is:

$$\Delta T_{ph} < (T_o/2) \quad (5)$$

Substituting equation (5) into equation (4)

$$(T_o/2) > (K-1)|T_o' - T_o| \quad (5)$$

Thus, $$\tfrac{1}{2} > (K - 1)\frac{|T_o - T_o|}{T_o} = (K-1)m \quad (6)$$

wherein $$m = \frac{|T_o - T_o|}{T_o},$$

which is the differential error.

Rewriting equation (6) yields $$K < 1 + \frac{0.5}{m} \quad (7)$$

Figure 2:
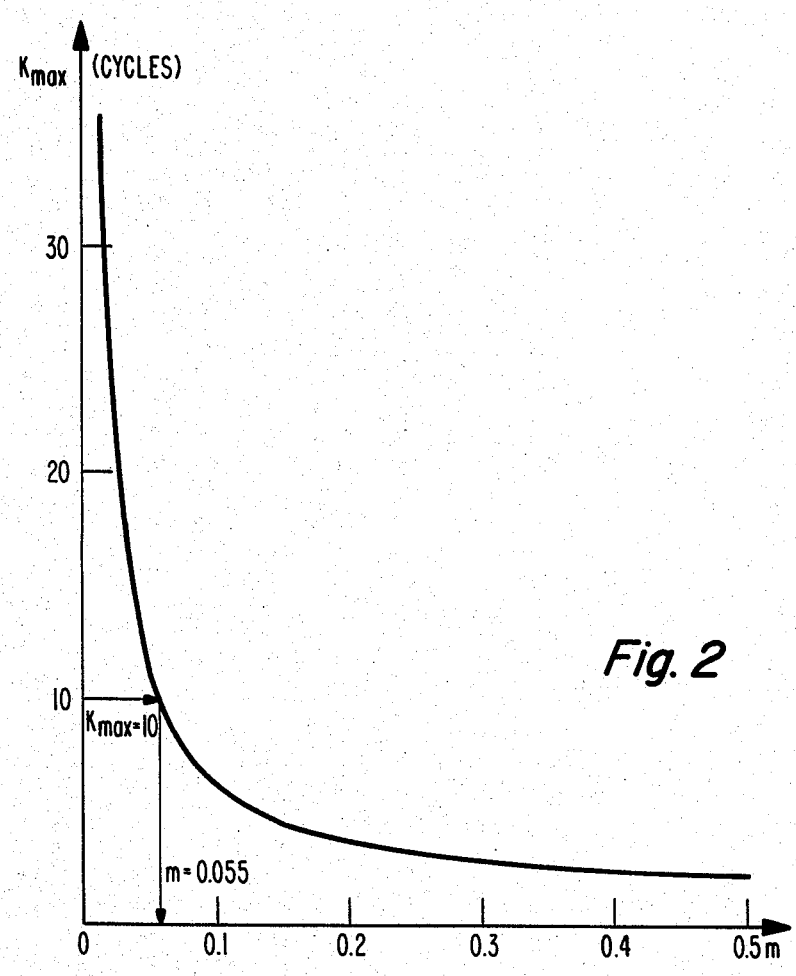
FIG. 2 is a graph of the maximum number of free running cycles before resynchronization versus timing error.

Thus the maximum value for K is:

$$K_{max} = 1 + \frac{0.5}{m}, \quad (8)$$

wherein $0 \leq m \leq 0.5$. A plot of equation (8) appears in FIG. 2, which plot can be used to determine the maximum differential error for a given $K_{max}$.

Figure 3:
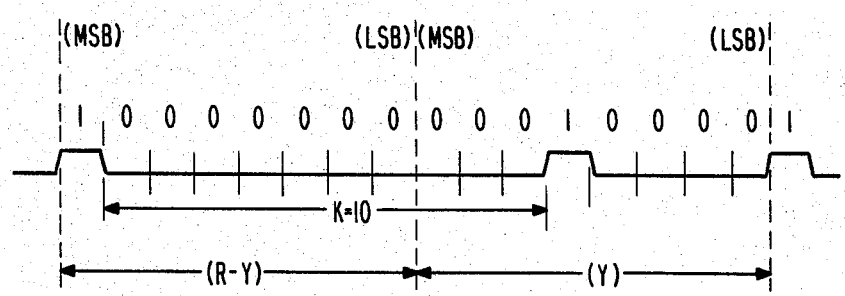
FIG. 3 shows a waveform when regenerating a digital video signal.

Consider now a digital video signal. The digital video coding standard specifies that the black level of the luminance signal corresponds to 16 (binary 10000) and the white level to 235 of an 8-bit scale of 0 to 255. Further, a voltage of zero for the color difference signals will correspond to 128 (binary 10000000) and the nominal excursion of these signals will be between levels 16 and 239. As a result, there will be no data words containing only 8 zeros or only 8 ones. The worst case value for K is K = 10 and occurs if black is transmitted for the color difference signal followed by black for the Y signal as can be seen in FIG. 3. The value of the allowable differential error m can be obtained from the plot in FIG. 13. For $K_{max} = 10$, $m = 0.055$. Since $$m = \frac{|T_o - T_o|}{T_o},$$

then for $T'_o > T_o$, $mT_o = T'_o - T_o$, or $T'_o = T_o(1+m)$. Since $T_o = 4.63$ ns, as described above, $T_o' = 4.88$ ns. For $T'_o < T_o$, $mT_o - T_o = -T'_o$ or $T'_o = T_o(1-m)$. Thus $T'_o = 4.38$ ns. Thus $T_2$ must be adjusted so that the oscillation period lies between 4.38 ns and 4.88 ns, which corresponds to 228 MHz and 205 MHz respectively.

Figure 4:
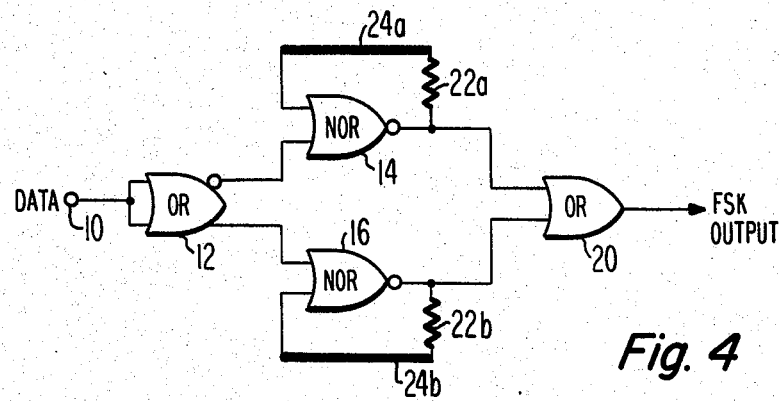
FIG. 4 shows a second embodiment of the invention.
Figure 5:
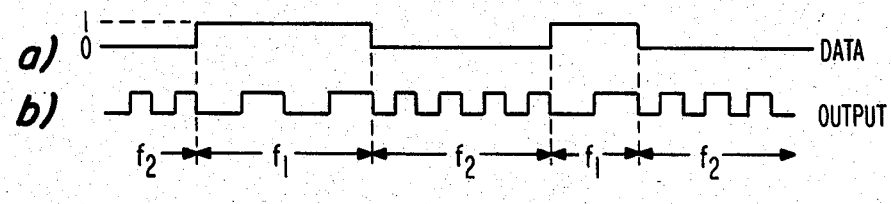
FIG. 5 shows some waveforms present in FIG. 4.

FIG. 4 shows a second embodiment of the invention wherein corresponding reference numerals designate corresponding elements. In FIG. 4 lines 24a and 24b have different delays, and thus oscillation of NOR gates 14 and 16 takes place at two different frequencies $f_1$ and $f_2$ respectively. FIG. 5a shows the data waveform and FIG. 5b the output waveform. It will be seen that when the data is ONE frequency $f_1$ is produced, while when the data is ZERO frequency $f_2$ is produced, the two signals being combined by gate 20. Thus the embodiment of FIG. 4 comprises a frequency shift keying encoder.

What is claimed is:

1. Apparatus comprising
    a first OR gate having a pair of inputs for receiving data signals, and a complementary pair of outputs;
    a pair of oscillators for producing output signals having substantially the same frequency, each oscillator comprising a NOR gate having a first input coupled to a respective one of said first OR gate outputs, a second input, and an output, and a transmission line coupled between said output and said second input;
    a second OR gate having a pair of inputs both coupled to one of said first OR gate outputs, and an output for providing delayed data pulses;
    a third OR gate having a pair of inputs respectively coupled to said NOR gate outputs, and an output for providing regenerated clock pulses;
    and a transmission line means for delaying said regenerated clock pulses so that the positive going edges thereof occur approximately in the middle of said delayed data pulses.

* * * * *